US 11,199,416 B2

(12) United States Patent
Wilczynski et al.

(10) Patent No.: US 11,199,416 B2
(45) Date of Patent: Dec. 14, 2021

(54) SYSTEMS AND METHODS FOR FLEXIBLE ROUTE PLANNING

(71) Applicant: Palantir Technologies Inc., Palo Alto, CA (US)

(72) Inventors: Peter Wilczynski, San Francisco, CA (US); Reese Glidden, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 108 days.

(21) Appl. No.: 16/450,898

(22) Filed: Jun. 24, 2019

(65) Prior Publication Data
US 2019/0310093 A1    Oct. 10, 2019

Related U.S. Application Data

(63) Continuation of application No. 15/826,446, filed on Nov. 29, 2017, now Pat. No. 10,371,537.

(51) Int. Cl.
*G01C 21/00*    (2006.01)
*G01C 21/34*    (2006.01)
*G01C 21/36*    (2006.01)

(52) U.S. Cl.
CPC ..... *G01C 21/3415* (2013.01); *G01C 21/3423* (2013.01); *G01C 21/3461* (2013.01); *G01C 21/3605* (2013.01)

(58) Field of Classification Search
None
See application file for complete search history.

(56) References Cited

U.S. PATENT DOCUMENTS

| | | | |
|---|---|---|---|
| 4,899,161 A | | 2/1990 | Morin et al. |
| 4,958,305 A | | 9/1990 | Piazza |
| 5,329,108 A | | 7/1994 | Lamoure |
| 5,638,280 A | * | 6/1997 | Nishimura ......... G01C 21/3446 340/990 |

(Continued)

FOREIGN PATENT DOCUMENTS

| | | |
|---|---|---|
| AU | 2012216622 A1 | 4/2013 |
| DE | 102013222023 A1 | 1/2015 |

(Continued)

OTHER PUBLICATIONS

"A First Look: Predicting Market Demand for Food Retail using a Huff Analysis," TRF Policy Solutions, Jul. 2012, p. 30.
"Andy Turner's GISRUK 2012 Notes" <https://docs.google.com/document/d/1cTmxg7mVx5gd89lqblCYvCEnHA4QAivH4-l4WpyPsqE4/edit?pli=1> printed Sep. 16, 2013 in 15 pages.

(Continued)

*Primary Examiner* — Jonathan M Dager
(74) *Attorney, Agent, or Firm* — Sheppard Mullin Richter & Hampton LLP

(57) ABSTRACT

Systems, methods, and non-transitory computer readable media are provided for flexible route planning. Locations for a planned movement may be obtained. The locations may include at least a starting location and an ending location. A route for the planned movement may be determined. The route may include at least the starting location and the ending location. A composite cost of using the route may be determined. The composite cost may include at least a temporal cost component and a non-temporal cost component. An interface through which the composite cost is accessible may be provided.

19 Claims, 7 Drawing Sheets

(56) References Cited

U.S. PATENT DOCUMENTS

| | | |
|---|---|---|
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,958,753 B2 | 10/2005 | Abe |
| 6,983,203 B1 | 1/2006 | Wako |
| 6,985,950 B1 | 1/2006 | Hanson et al. |
| 7,036,085 B2 | 4/2006 | Barros |
| 7,133,771 B1* | 11/2006 | Nesbitt .............. G01C 21/3453 |
| | | 701/533 |
| 7,158,878 B2 | 1/2007 | Rasmussen et al. |
| 7,375,732 B2 | 5/2008 | Arcas |
| 7,379,811 B2 | 5/2008 | Rasmussen et al. |
| 7,457,706 B2 | 11/2008 | Malero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,881,861 B2* | 2/2011 | Kravets .............. G01C 21/3484 |
| | | 701/416 |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskains |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,108,141 B2* | 1/2012 | Ehrlacher .......... G01C 21/3461 |
| | | 701/416 |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,463,537 B2* | 6/2013 | Mueller ............. G01C 21/3438 |
| | | 701/302 |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,008,888 B1* | 4/2015 | Gravino ............. G01C 21/3682 |
| | | 701/26 |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 9,360,335 B1* | 6/2016 | Powelson .......... G01C 21/3415 |
| 9,547,986 B1* | 1/2017 | Curlander ................ G08G 1/14 |
| 9,784,589 B1* | 10/2017 | Gyenes ................ G09B 29/106 |
| 10,133,995 B1* | 11/2018 | Reiss ............. G06Q 10/063114 |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0143602 A1 | 6/2005 | Yada et al. |
| 2005/0162523 A1 | 7/2005 | Darrell et al. |
| 2005/0182502 A1 | 8/2005 | Lyengar |
| 2005/0182793 A1 | 8/2005 | Keenan et al. |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0184314 A1* | 8/2006 | Couckuyt .......... G01C 21/3423 |
| | | 701/533 |
| 2006/0200384 A1 | 9/2006 | Arutunian et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0027628 A1* | 2/2007 | Geelen ..................... G01S 19/24 |
| | | 701/469 |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0150369 A1* | 6/2007 | Zivin ................. G06Q 30/0631 |
| | | 705/26.64 |
| 2007/0168118 A1* | 7/2007 | Lappe .................. G01C 21/005 |
| | | 701/408 |
| 2007/0188516 A1 | 8/2007 | Loup et al. |
| 2007/0208497 A1 | 9/2007 | Downs et al. |
| 2007/0208498 A1 | 9/2007 | Barker et al. |
| 2007/0258642 A1 | 11/2007 | Thota |

(56) References Cited

U.S. PATENT DOCUMENTS

| | | | |
|---|---|---|---|
| 2007/0293958 A1* | 12/2007 | Stehle | G06Q 30/0207 700/30 |
| 2007/0294643 A1 | 12/2007 | Kyle | |
| 2008/0010605 A1 | 1/2008 | Frank | |
| 2008/0040684 A1 | 2/2008 | Crump | |
| 2008/0077642 A1 | 3/2008 | Carbone et al. | |
| 2008/0082578 A1 | 4/2008 | Hogue et al. | |
| 2008/0098085 A1 | 4/2008 | Krane et al. | |
| 2008/0104019 A1 | 5/2008 | Nath | |
| 2008/0133579 A1 | 6/2008 | Lim | |
| 2008/0163073 A1 | 7/2008 | Becker et al. | |
| 2008/0192053 A1 | 8/2008 | Howell et al. | |
| 2008/0195417 A1 | 8/2008 | Surpin et al. | |
| 2008/0223834 A1 | 9/2008 | Griffiths et al. | |
| 2008/0229056 A1 | 9/2008 | Agarwal et al. | |
| 2008/0263468 A1 | 10/2008 | Cappione et al. | |
| 2008/0267107 A1 | 10/2008 | Rosenberg | |
| 2008/0270468 A1 | 10/2008 | Mao | |
| 2008/0278311 A1 | 11/2008 | Grange et al. | |
| 2008/0288306 A1 | 11/2008 | MacIntyre et al. | |
| 2008/0294678 A1 | 11/2008 | Gorman et al. | |
| 2008/0301643 A1 | 12/2008 | Appleton et al. | |
| 2009/0027418 A1 | 1/2009 | Maru et al. | |
| 2009/0088964 A1 | 4/2009 | Schaaf et al. | |
| 2009/0100018 A1 | 4/2009 | Roberts | |
| 2009/0115786 A1 | 5/2009 | Shmiasaki et al. | |
| 2009/0132921 A1 | 5/2009 | Hwangbo et al. | |
| 2009/0132953 A1 | 5/2009 | Reed et al. | |
| 2009/0144262 A1 | 6/2009 | White et al. | |
| 2009/0158185 A1 | 6/2009 | Lacevic et al. | |
| 2009/0171567 A1* | 7/2009 | Morimoto | G01C 21/3685 701/465 |
| 2009/0171939 A1 | 7/2009 | Athsani et al. | |
| 2009/0172511 A1 | 7/2009 | Decherd et al. | |
| 2009/0179892 A1 | 7/2009 | Tsuda et al. | |
| 2009/0187447 A1 | 7/2009 | Cheng et al. | |
| 2009/0187464 A1 | 7/2009 | Bai et al. | |
| 2009/0222400 A1 | 9/2009 | Kupershmidt et al. | |
| 2009/0292626 A1 | 11/2009 | Oxford | |
| 2010/0036599 A1* | 2/2010 | Froeberg | G01C 21/3461 701/532 |
| 2010/0057716 A1 | 3/2010 | Stefik et al. | |
| 2010/0063961 A1 | 3/2010 | Guiheneuf et al. | |
| 2010/0070523 A1 | 3/2010 | Delgo et al. | |
| 2010/0076968 A1 | 3/2010 | Boyns et al. | |
| 2010/0106420 A1 | 4/2010 | Mattikalli et al. | |
| 2010/0162176 A1 | 6/2010 | Dunton | |
| 2010/0185692 A1 | 7/2010 | Zhang et al. | |
| 2010/0198684 A1 | 8/2010 | Eraker et al. | |
| 2010/0199225 A1 | 8/2010 | Coleman et al. | |
| 2010/0277611 A1 | 11/2010 | Holt et al. | |
| 2010/0293174 A1 | 11/2010 | Bennett et al. | |
| 2010/0321399 A1 | 12/2010 | Ellren et al. | |
| 2011/0022312 A1 | 1/2011 | McDonough et al. | |
| 2011/0090254 A1 | 4/2011 | Carrino et al. | |
| 2011/0106429 A1* | 5/2011 | Poppen | G01C 21/3617 701/533 |
| 2011/0117878 A1 | 5/2011 | Barash et al. | |
| 2011/0137766 A1 | 6/2011 | Rasmussen et al. | |
| 2011/0153368 A1 | 6/2011 | Pierre et al. | |
| 2011/0161096 A1 | 6/2011 | Buehler et al. | |
| 2011/0170799 A1 | 7/2011 | Carrino et al. | |
| 2011/0208724 A1 | 8/2011 | Jones et al. | |
| 2011/0218934 A1 | 9/2011 | Elser | |
| 2011/0225198 A1 | 9/2011 | Edwards et al. | |
| 2011/0238690 A1 | 9/2011 | Arrasvuori et al. | |
| 2011/0246061 A1* | 10/2011 | Hayashi | G01C 21/3469 701/533 |
| 2011/0270705 A1 | 11/2011 | Parker | |
| 2012/0066296 A1 | 3/2012 | Appleton et al. | |
| 2012/0084118 A1 | 4/2012 | Bai et al. | |
| 2012/0106801 A1 | 5/2012 | Jackson | |
| 2012/0123678 A1* | 5/2012 | Poppen | G01C 21/3476 701/468 |
| 2012/0123806 A1* | 5/2012 | Schumann, Jr. | G06Q 40/08 705/4 |
| 2012/0136689 A1* | 5/2012 | Ickman | G06Q 50/01 705/7.19 |
| 2012/0144335 A1 | 6/2012 | Abeln et al. | |
| 2012/0158527 A1 | 6/2012 | Cannelongo et al. | |
| 2012/0159363 A1 | 6/2012 | DeBacker et al. | |
| 2012/0173985 A1 | 7/2012 | Peppel | |
| 2012/0206469 A1 | 8/2012 | Hulubei et al. | |
| 2012/0208636 A1 | 8/2012 | Feige | |
| 2012/0221580 A1 | 8/2012 | Barney | |
| 2012/0239288 A1* | 9/2012 | Forutanpour | G06Q 30/02 701/410 |
| 2012/0253661 A1* | 10/2012 | Tuukkanen | G01C 21/3415 701/423 |
| 2012/0323888 A1 | 12/2012 | Osann, Jr. | |
| 2013/0006725 A1 | 1/2013 | Simanek et al. | |
| 2013/0021445 A1 | 1/2013 | Cossette-Pacheco et al. | |
| 2013/0057551 A1 | 3/2013 | Ebert et al. | |
| 2013/0060786 A1 | 3/2013 | Serrano et al. | |
| 2013/0073377 A1 | 3/2013 | Heath | |
| 2013/0076732 A1 | 3/2013 | Cervelli et al. | |
| 2013/0100134 A1 | 4/2013 | Cervelli et al. | |
| 2013/0101159 A1 | 4/2013 | Chao et al. | |
| 2013/0132398 A1 | 5/2013 | Pfiefle | |
| 2013/0150004 A1 | 6/2013 | Rosen | |
| 2013/0176321 A1 | 7/2013 | Mitchell et al. | |
| 2013/0179420 A1 | 7/2013 | Park et al. | |
| 2013/0254900 A1 | 9/2013 | Sathish et al. | |
| 2013/0268520 A1 | 10/2013 | Fisher et al. | |
| 2013/0279757 A1 | 10/2013 | Kephart | |
| 2013/0282723 A1 | 10/2013 | Petersen et al. | |
| 2013/0339891 A1 | 12/2013 | Blumenberg et al. | |
| 2014/0005941 A1* | 1/2014 | Paek | G01C 21/3415 701/533 |
| 2014/0176606 A1 | 6/2014 | Narayan et al. | |
| 2014/0218400 A1 | 8/2014 | O'Toole et al. | |
| 2014/0236462 A1* | 8/2014 | Healey | G08G 1/096827 701/117 |
| 2014/0282093 A1* | 9/2014 | Burke | H04W 4/18 715/753 |
| 2014/0333651 A1 | 11/2014 | Cervelli et al. | |
| 2014/0337772 A1 | 11/2014 | Cervelli et al. | |
| 2014/0361899 A1 | 12/2014 | Layson | |
| 2014/0372498 A1* | 12/2014 | Mian | B61L 15/0072 709/201 |
| 2015/0029176 A1 | 1/2015 | Baxter et al. | |
| 2015/0032366 A1* | 1/2015 | Man | H04W 4/024 701/412 |
| 2015/0100907 A1 | 4/2015 | Erenrich et al. | |
| 2015/0106170 A1 | 4/2015 | Bonica | |
| 2015/0120176 A1* | 4/2015 | Curtis | G06Q 50/28 701/119 |
| 2015/0186821 A1 | 7/2015 | Wang et al. | |
| 2015/0187036 A1 | 7/2015 | Wang et al. | |
| 2015/0187100 A1 | 7/2015 | Berry et al. | |
| 2015/0312323 A1 | 10/2015 | Peterson | |
| 2015/0338233 A1 | 11/2015 | Cervelli et al. | |
| 2015/0338852 A1* | 11/2015 | Ramanujam | G08G 1/202 701/2 |
| 2015/0339928 A1* | 11/2015 | Ramanujam | G06Q 50/30 701/23 |
| 2015/0379413 A1 | 12/2015 | Robertson et al. | |
| 2016/0069694 A1* | 3/2016 | Tao | H04W 4/02 701/410 |
| 2016/0109251 A1* | 4/2016 | Thakur | G01C 21/343 705/335 |
| 2016/0109252 A1* | 4/2016 | Caine | G06Q 30/02 701/533 |
| 2016/0142964 A1* | 5/2016 | Todasco | H04W 4/80 455/41.2 |
| 2016/0203422 A1* | 7/2016 | Demarchi | G06F 16/29 705/6 |
| 2016/0223348 A1* | 8/2016 | Witte | G01C 21/34 |
| 2016/0229404 A1* | 8/2016 | Byun | G05D 1/0088 |
| 2016/0273930 A1* | 9/2016 | Wada | G01C 21/3626 |
| 2016/0298974 A1* | 10/2016 | Newlin | G06Q 10/025 |
| 2016/0298977 A1* | 10/2016 | Newlin | G01C 21/20 |

(56) References Cited

U.S. PATENT DOCUMENTS

| | | | | |
|---|---|---|---|---|
| 2016/0334233 | A1* | 11/2016 | Baverstock | B60W 30/16 |
| 2016/0379486 | A1* | 12/2016 | Taylor | G01C 21/3691 340/905 |
| 2017/0167882 | A1* | 6/2017 | Ulloa Paredes | G01C 21/3492 |
| 2017/0169373 | A1* | 6/2017 | Roulland | G06Q 10/06313 |
| 2017/0192437 | A1* | 7/2017 | Bier | G05D 1/0016 |
| 2017/0262790 | A1* | 9/2017 | Khasis | G08G 1/0116 |
| 2017/0268891 | A1* | 9/2017 | Dyrnaes | G01C 21/3682 |
| 2017/0276507 | A1* | 9/2017 | Zacharenko | G06F 16/904 |
| 2017/0300049 | A1* | 10/2017 | Seally | G06Q 10/047 |
| 2017/0314939 | A1* | 11/2017 | Carter | G01C 21/3492 |
| 2017/0314948 | A1* | 11/2017 | Racah | G01C 21/3438 |
| 2017/0314949 | A1* | 11/2017 | Rovik | G01C 21/3461 |
| 2017/0337813 | A1* | 11/2017 | Taylor | G08G 1/0965 |
| 2017/0370738 | A1* | 12/2017 | Park | G01C 21/3415 |
| 2018/0143027 | A1* | 5/2018 | Schlesinger | G06Q 50/30 |
| 2018/0143649 | A1* | 5/2018 | Miao | B60W 60/00 |
| 2018/0188065 | A1* | 7/2018 | Brooks | G01C 21/20 |
| 2018/0211541 | A1* | 7/2018 | Rakah | B60W 60/00253 |
| 2018/0211545 | A1* | 7/2018 | Smartt | G08G 1/161 |
| 2018/0211546 | A1* | 7/2018 | Smartt | G05D 1/0088 |
| 2018/0259976 | A1* | 9/2018 | Williams | G01C 21/32 |
| 2019/0042857 | A1* | 2/2019 | Endo | G06K 9/00805 |
| 2019/0113927 | A1* | 4/2019 | Englard | G05D 1/0231 |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | WO-9532424 A1 | 11/1995 |
| WO | WO-0009529 A2 | 2/2000 |
| WO | WO-0198925 A2 | 12/2001 |
| WO | WO-2004057268 A2 | 7/2004 |
| WO | WO-2005013200 A1 | 2/2005 |
| WO | WO-2008064207 | 5/2008 |
| WO | WO-2009061501 A1 | 5/2009 |
| WO | WO-2009123975 A1 | 10/2009 |
| WO | WO-2011058507 A1 | 5/2011 |

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to- -hunchlab/ on Sep. 9, 2014, 2 pages.
Barnes et al., "Viewshed Analysis", GIS-ARC/Info 2001, <www.evsc.virginia.edu/.about.jhp7e/evsc466/student_pres/Rounds.pdf.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, p. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-th- e-huff-model/123411.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-1J-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, p. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, p. 33.
Huff, David L., "Parameter Estimation in the Huff Model," ESRI, ArcUser, Oct.-Dec. 2003, pp. 34-36.
Ipbucker, C., "Inverse Transformation for Several Pseudocylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, p. 8.
Mandagere, Nagapramod, "Buffer Operations in GIS," <http://www-users.cs.umn.edu/.about.npramod/enc_pdf.pdf> retrieved Jan. 28, 2010, p. 7.
Map Builder, "Rapid Mashup Development Tool for Google and Yahoo Maps!" <http://web.archive.org/web/20090626224734/http://www.mapbuilder.net/&- gt; printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
POI Editor, "How to: Create Your Own Points of Interest," <http://www.poieditor.com/articles/how_to create_your_own_points_of_ interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, p. 8.
Qiu, Fang, "3d Analysis and Surface Modeling", <http://web.archive.org/web/20091202221925/http://www.utsa.edu/lrsg/Te- aching/EES65 13/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state-.la.us/gis/instruct_files/tutslide12> printed Jan. 3, 2013 in 1 page.

(56) References Cited

OTHER PUBLICATIONS

Tangelder et al., "Freeform Shape Matching Using Minkowski Operations," The Netherlands, Jun. 1996, p. 12.
Thompson, Mick, "Getting Started with GEO," Getting Started with GEO, Jul. 26, 2011.
Valentini et al., "Ensembles of Learning Machines", M. Marinaro and R. Tagliaferri (Eds.): WIRN VIETRI 2002, LNCS 2486, pp. 3-20.
VB Forums, "Buffer a Polygon," Internet Citation, <http://www.vbforums.com/showthread.php7198436-Buffer-a-Polygon>, Specifically Thread #1, #5 & #11 retrieved on May 2, 2013, p. 8.
Vivid Solutions, "JTS Topology Suite: Technical Specifications," <http://www.vividsolutions.com/jts/bin/JTS%20Technical%20Specs.pdf> Version 1.4, 2003, p. 36.
Wikipedia, "Douglas_Peucker-Algorithms," <http://de.wikipedia.org/w/index.php?title=Douglas-Peucker-Algorithmus- &oldid=91846042> printed Jul. 2011, p. 2.
Wikipedia, "Ramer_Douglas_Peucker Algorithm," <http://en.wikipedia.org/wiki/Ramer%E2%80%93Douglas%E2%80%93Peucker_al- gorithm> printed Jul. 2011, p. 3.
Wongsuphasawat et al., "Visual Analytics for Transportation Incident Data Sets," Transportation Research Record 2138, 2009, pp. 135-145.
Woodbridge, Stephen, "[geos-deyel] Polygon simplification," <http://lists.osgeo.org/pipermail/geos-deyel/2011-May/005210.html> dated May 8, 2011, p. 3.

\* cited by examiner

SYSTEMS AND METHODS FOR FLEXIBLE ROUTE PLANNING

CROSS REFERENCE TO RELATED APPLICATIONS

This application is a continuation of U.S. patent application Ser. No. 15/826,446 filed Nov. 29, 2017, the content of which is incorporated by reference in its entirety into the present disclosure.

FIELD OF THE INVENTION

This disclosure relates to approaches for flexible route planning.

BACKGROUND

Under conventional approaches, routes between different locations may be provided with expected travel durations. Such conventional approaches may not take non-traditional modes of travel and/or user preference for traveling into consideration.

SUMMARY

Various embodiments of the present disclosure may include systems, methods, and non-transitory computer readable media configured to provide flexible route planning. Various embodiments of the present disclosure may include systems, methods, and non-transitory computer readable media configured to obtain locations for a planned movement. The locations may include at least a starting location and an ending location. A route for the planned movement may be determined. The route may include at least the starting location and the ending location. A composite cost of using the route may be determined. The composite cost may include at least a temporal cost component and a non-temporal cost component. An interface through which the composite cost is accessible may be provided.

In some embodiments, the locations may include one or more intermediate locations. In some embodiments, the route may include multiple modes of motion along the route.

In some embodiments, the temporal cost component may be determined based on a temporal route graph. The temporal cost component may reflect an expected time duration to use the route.

In some embodiments, the non-temporal cost component may be determined based on a two-dimensional non-temporal cost map. The non-temporal cost component may reflect a measure of a characteristic of an environment through which the route travels. The characteristic may include at least one of: a geographic characteristic, a preference characteristic, a difficulty characteristic, or a risk characteristic. These characteristics may be computed as a combination of remote sensing events or manually entered risk factors.

In some embodiments, the interface may enable creation of a new path for the route based on a change to an environment through which the route travels.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
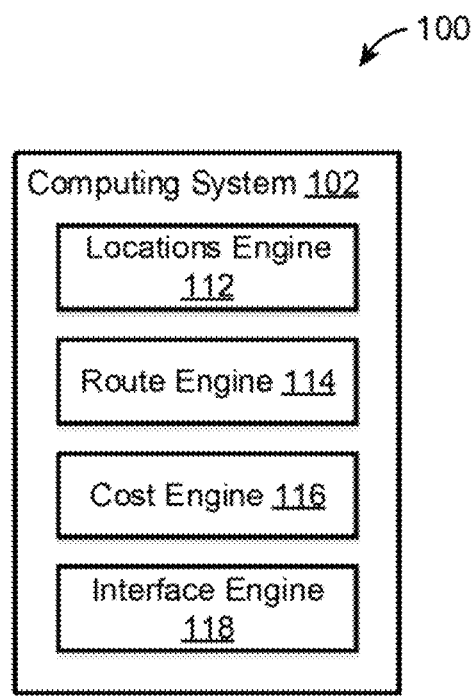
FIG. 1 illustrates an example environment for providing flexible route planning, in accordance with various embodiments.

A claimed solution rooted in computer technology overcomes problems specifically arising in the realm of computer technology. In various implementations, a computing system may obtain locations for a planned movement (e.g., of one or more entities, such as one or persons/teams/vehicles). The locations may include a starting location and an ending location. In some embodiments, the locations may include one or more intermediate locations (e.g., waypoints).

The computing system may determine a route, including the starting location and the ending location, for the planned movement. Information corresponding to the route may be pushed to or pulled by a user device. The computing system may determine a composite cost of using the route. The computing system can also provide an interface through which the composite cost is accessible.

In some embodiments, the composite cost may include a temporal cost component and a non-temporal cost component. In some embodiments, the cost component may be determined based on a route graph (edge/node weighting). For example, the cost component may reflect an expected time duration to use the route. In some embodiments, the cost component may be determined based on a two-dimensional cost map (e.g., pixel cost). For example, the cost component may reflect a measure of a characteristic of an environment (e.g., geographic characteristic, preference characteristic, difficulty characteristic, risk characteristic) through which the route travels. The characteristic of the environment may be static (e.g., does not change over time)

or dynamic (e.g., changes over time). In some embodiments, the characteristic of the environment may exist based on an occurrence of an event. In such embodiments, the cost from the event may be projected (in time and/or space) in the cost map. In some embodiments, a route graph may be re-weighted based on a two-dimensional cost map. Both route graphs and cost maps can be used to compute temporal and non-temporal costs.

In some embodiments, the route may be determined based on a user's selection of one or more paths along the route (e.g., free draw). In some embodiments, the route may include optional paths based on one or more contingencies (e.g., contingencies along the route). In some embodiments, the route may include optional paths based on one or more properties/conditions of the route (e.g., time/season at which the route is used, weather/lighting conditions during which the route is used, etc.).

In some embodiments, the route may provide for coordination of a planned movement of multiple entities (e.g., multiple entities reaching one or more locations at the same time/at particular times). In some embodiments, the route may be randomized to reduce predictability of the route. In some embodiments, the route may include multiple modes of motion (e.g., walking, driving, flying, etc.) along the route.

In some embodiments, sensitivity of the route determination may change along the route (e.g., the first 95% of the route determined using low sensitivity to provide a general route and the last 5% of the route determined using high sensitivity to provide a detailed route). In some embodiments, the interface may enable creation of a new path for the route based on a change to the environment through which the route travels (e.g., installing a ladder to climb a barrier, knocking down a wall/door to create a new opening, etc.).

In some embodiments, the interface may provide for visualization of the temporal and geospatial aspects of the movement along the route. In some embodiments, the interface may provide for different visualization of the temporal cost component and/or the non-temporal cost component of the composite cost.

The approaches disclosed herein enable determination of flexible routes using multiple factors. Multiple temporal and/or non-temporal cost components may be taken into account to determine a route between a starting location and an ending location. The temporal cost component may take into account the duration of time expected to take to traverse the route. Further, the non-temporal cost component may take into account non-temporal characteristics of the route (e.g., geography, user preference, difficulty, risk) to provide multi-dimensional weighting of costs to use the route. Such combination of both temporal and non-temporal costs may provide for determination of cost using a combination of information corresponding to a temporal route graph and information corresponding to a two-dimensional non-temporal cost map. Such provision of flexible routes may be used to plan original routes and/or to plan modified routes (e.g., changes to routes in case of emergency). Such provision of flexible routes may be used to determine routes when one or more edges/nodes of the temporal route graph are unavailable (e.g., road/waypoint inaccessible due to weather).

FIG. 1 illustrates an example environment 100 for providing flexible route planning, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a locations engine 112, a route engine 114, a cost engine 116, an interface engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the locations engine 112 is configured to obtain information describing locations for a planned movement. A planned movement may refer to an arranged/designed change in a position/physical location of one or more entities. For example, a planned movement may include a future change in a position/physical location of persons, teams, vehicles, and/or other things. Locations for a planned movement may refer to positions/physical locations to/from which one or more of the entities may move. For example, the locations for a planned movement may include at least a starting location and an ending location. In some implementations, the planned movement may include multiple starting locations and/or multiple ending locations. For example, the planned movement may include movement of multiple entities that may start from different starting locations and/or end at different ending locations.

In various embodiments, locations for a planned movement may include one or more locations between the starting location(s) and the ending location(s). Such locations may be referred to as intermediate locations or waypoints. For example, a planned movement may include movement of a vehicle from a starting point to a waypoint and from the waypoint to an ending location. Other locations for a planned movement are contemplated.

In some embodiments, one or more locations may be associated with a time duration. For example, the planned movement may include an entity spending a given amount of time at a starting location, a waypoint, and/or an ending location. For example, the planned movement may have a vehicle moving from the starting point to the waypoint, spending thirty minutes at the way point, and then moving on to the ending location. The locations within the planned movement, an amount of time to be spent at each of the different locations, and/or other information about the planned movement may be recorded (or stored) within an itinerary.

The information describing locations needed for a planned movement may be obtained by the locations engine 112 directly at the computing system 102 (e.g., provided by a user using the computing system 102) or received from another computing device (e.g., provided by a user operating a computing device communicating with the computing system 102). The information describing locations needed for a planned movement may be received by the computing system 102/another computing device in advance and may be retrieved by the locations engine 112 at a later time. For example, information describing locations for a planned movement may be received and stored in memory of the computing system 102. The information is thus available to be loaded by the computing system 102 at a later time. The locations for a planned movement may be received at once or in multiple parts. For example, the locations engine 112 may receive from a user information describing all locations for a planned movement within a single communication. As another example, the locations engine 112 may receive from a user information describing one or more locations for a planned movement within one communication and information describing other location(s) within another communication (e.g., a user enters starting location and an ending location during a certain time, and then enters additional location(s)/makes changes to entered location(s) at another time). Many variations are possible.

In some embodiments, information describing locations for a planned movement may be obtained based on a user's interaction with a user interface. The user interface may enable a user to enter one or more locations for the planned movement. For example, the user interface may include an itinerary interface that can be used to input one or more locations for the planned movement and keep track of the entered locations. The itinerary interface may enable a user to change one or more locations (e.g., add a new location, remove an existing location, modify an existing location to another location) and/or change an order of the locations (e.g., swaps positions between a starting location and an ending location to obtain a reverse route, change in which order waypoints may be visited).

As another example, the user interface may include a map interface. The map interface may display a view (e.g., satellite map, street map, topographical map, climate map, etc.) of a geographic area. The map interface may enable a user to enter one or more locations (e.g., tagging/clicking on a position within a map as a starting location), change one or more locations (e.g., adding, removing, modifying locations), and/or change an order of locations (e.g., specify in what order the waypoints will be visited). For example, the map interface may enable a user to set points/areas on a map as a starting location, an ending location, and/or one or more waypoints. The map interface may provide functionality that permits a user to identify where the starting location, the ending location, and/or the waypoints are located in the view provided by the map interface.

In various embodiments, the route engine 114 is configured to determine a route for the planned movement. A route for the planned movement may refer to one or more paths/courses that may be used by one or more entities to travel from one or more starting locations to one or more ending locations. For example, a route may include paths/courses to be used by a single entity to move from a starting location to an ending location. As another example, the route may include paths/courses to be used by multiple entities. Such a route may be used to provide for coordination of movement of multiple entities (e.g., coordinate multiple entities reaching one or more locations at the same time/at particular times). A route may be static (does not change with time, conditions, variables, etc.) or may by dynamic (changes with time, conditions, variables, etc.). The route engine may determine a route for the planned movement so that the route includes at least a starting location and an ending location. The route may include other location(s), such as one or more waypoints between the starting location and the ending location.

The route engine 114 may determine the route for the planned movement based on one or more parameters. For example, the route engine 114 may use one or more of a least-cost analysis, a temporal route graph, a two-dimensional non-temporal cost map, a contingency, a route property/condition, free draw, deconfliction, and/or other information to determine the route for the planned movement. A least-cost analysis may include analysis of different paths/courses for the route to determine the path(s)/course(s) that require the least cost to use for traveling. Such analysis may include cost analysis of a single factor (e.g., a time cost of taking a given path/course) or multiple factors (e.g., a time-cost and a non-time cost of taking a given path/course, multiple non-time costs of taking a given path/course). Such analysis may use temporal route graph(s) and/or two-dimensional non-temporal cost map(s).

A temporal route graph may refer to a graph of nodes and edges that represent different times required to use a given path/course. Individual nodes on the graph may represent a location and edges between the nodes may represent the time required to move (or travel) between the locations. In some embodiments, one or more nodes may be associated with a time requirement. For example, a waypoint may be associated with a thirty-minute time period (e.g., an entity using the route is expected to spend thirty minutes at the waypoint before moving on). A temporal route graph may be used to determine an expected time duration needed to use a particular route.

A two-dimensional non-temporal cost map may refer to a rasterized visualization of a non-temporal cost of moving across different points/areas. A non-temporal cost may relate to one or more characteristics of an environment through which a route travels. For example, a two-dimensional non-temporal cost may provide a measure of cost in terms of geographic characteristic, preference characteristic, difficulty characteristic, risk characteristic, and/or other characteristics of the environment through which the route travels. The measure of a cost for moving (or traveling) over a geographic point/area may be represented by a corresponding color/intensity of pixels in the two-dimensional non-temporal cost map. For example, the risk of moving over different points in an area may be reflected using a heat map. In this example, colors/intensities of pixels corresponding to the different points in the area may indicate corresponding amounts of risk associated with traveling over, or along, the different points. Other types of two-dimensional non-temporal cost maps are contemplated. A two-dimensional non-temporal cost map may be used to determine a non-temporal cost of using a particular route.

A least-cost analysis may balance costs of different factors equally or non-equally. For example, one determination of a route may equally balance a time required to take a path/course (determined using a temporal route graph) and a risk/danger of taking the path/course (determined using a two-dimensional non-temporal cost map). As another example, another determination of a route may place more emphasis on (weigh more heavily) a risk/danger of taking a path/course than on a user's preferences for certain paths/courses (e.g., a user preferring to take coastal rather than in-land paths). In some embodiments, a least-cost analysis may include one or more minimum or maximum costs. For example, a least-cost analysis may not allow a route that has more than a certain amount of temporal/non-temporal cost to be determined (e.g., setting maximum limit(s) on an expected time/risk for the route) and/or a least-cost analysis may now allow a route that has less than a certain amount of temporal/non-temporal cost to be determined (e.g., setting minimum limit(s) on an expected time/difficulty for the route). In some embodiments, the weighing of the two-dimensional non-temporal cost map and/or the balancing of factors may be user-controlled. For example, the profile of the two-dimensional non-temporal cost map may be determined by a user's risk/danger profile (e.g., risk/danger adverseness of the user). Other combination/balancing of factors for route determination are contemplated.

Use of contingency for route determination may provide for different routes/paths/courses based on changes in circumstances. The route engine 114 may determine a route with different/optional paths/courses depending on one or more contingencies occurring before or while using the route, such as one or more events/activities (that occur prior to or during usage of the route), one or more route properties/conditions (e.g., different paths/courses based on whether a certain path/course is accessible or not, different paths/courses based lighting/weather conditions during usage of the route), and/or other information for the route. For example, a route may include optional paths/courses based on one or more properties/conditions of the route (e.g., time/season at which the route is used, weather/lighting conditions during which the route is used, etc.). For example, a route may include optional paths/courses based on identities of any entities using the route.

Use of a contingency for route determination may provide for different/optional paths/courses for a single entity or multiple entities. For example, a route may be determined for two entities. In this example, a contingency for the route may provide for a different path/course to be taken by one of the entities based on how the other entity uses the route. As another example, a route may be determined for multiple entities. In this example, a contingency for a route may provide for different paths/courses to be taken by the different entities based on occurrences of one or more events.

Use of free draw for route determination may provide for user customization of the paths/courses in the route. Free draw may refer to a user's own setting of the paths/courses. For example, a user interface may allow a user to draw paths/courses to be used in a route and/or may allow a user to change the paths/courses in the route (e.g., via inserting a new path/course, deleting an existing path/course, modifying an existing path/course). The route may be determined based on a user's selection of one or more particular paths/courses along the route.

Use of deconfliction for route determination may provide for reduction in conflicts (e.g., collision) for a single or multiple entities using the route. For example, deconfliction may be used to route a single entity to different locations within an area (e.g., not visiting the same location more than a certain number of times) and/or to route multiple entities to the same location at the same time (e.g., have two or entities arriving/being at a particular location at the same time) or to different location at the same/different times.

In some embodiments, a route may be randomized to reduce predictability of the route. For example, the route engine 114 may determine a route using one or more randomized parameters to decrease the likelihood that the same route will be used repeatedly. As another example, the route engine 114 may store used routes and compare routes to the used routes to ensure that a particular route (or one or more portions of the route) is not used more than a threshold number of times and/or is not repeated a threshold number of times.

In some embodiments, a route may include multiple modes of motion along the route. For example, the route may include one or more paths/courses (or one or more portions) that are to be traveled using different mode(s) of motion (e.g., walking, driving, riding a train/bus, biking, flying, swimming, etc.) from other paths/courses (or one or more other portions). The usage of different modes of motion may be provided as an option for any entities using the route (e.g., different paths/courses based on the mode of motion used). The mode(s) selected may be determined based on a user-selection (e.g., a user selecting a given mode of motion for a particular portion of a route using a user interface), may be determined based on availability of the modes of motion, and/or based on other information.

In some embodiments, the sensitivity of a route determination may change along the route. The route engine 114 may determine a route using different amount of sensitivity (e.g., using more or less precise temporal/non-temporal cost determinations) along the route. For example, the route engine 114 may determine one portion of the route (e.g., the first 95% of the route) using a low sensitivity to provide a general route and determine another portion of the route (e.g., the remaining 5% of the route) using a high sensitivity to provide a detailed route. Usage of low sensitivity for a portion of the route may provide for cost-savings in resources (e.g., computing resources, planning resources). Such an approach may allow the route engine 114 to develop a route that may be generally followed (e.g., the route provides for the general path/course and/or the mode(s) of motion to be used) for a portion of the route and specifically followed (e.g., the route provides step-by-step instructions on the precise path/course to be used and/or the mode(s) of motion to be used) for another portion of the route. Such an approach may allow the route engine 114 to determine a route using more general factors (e.g., more general temporal route graph/two-dimensional non-temporal cost map) for a portion of the route and more specific factors (e.g., more detailed temporal route graph/two-dimensional non-temporal cost map) for another portion of the route.

In some embodiments, the route engine 114 may determine a route using one or more changes to an environment through which the route travels. For example, an environment through which the route travels may include a barrier that prohibits the use of a road by an entity. The route engine 114 may determine a route that overcomes the barrier, for example, based on a change in the environment. In this example, the route engine 114 may determine a change to the environment that allows the entity to use the road (e.g., installing a ladder to climb the barrier, knocking down a wall/door to create a new opening, etc.). The change(s) to the environment may be received by the route engine 114 based on a user's interaction with an interface (e.g., user interface). In some embodiments, one or more changes in the environment may be provided as an option/contingency in the route determination. For example, the route engine 114 may determine a route that provides for a particular path/course to be used if an environment is changed (e.g., by an entity that is planning on taking the particular path/course, by another entity that is taking another path/course) before or during the use of the route and another path/course to be used if the environment is not changed. For example, the route may include teams of rescuers moving in coordination and one team of rescuers may move along a particular path/course based on a change to the environment (as performed by the team of rescuers or another team of rescuers) and may move along another path/course based on the team of rescuers/another team of rescuers being unable to make the change to the environment (e.g., a team of rescuers unable to knock down a door in their path; a team of rescuers unable to stop a flow of water into a path to be taken by another team of rescuers).

Information corresponding to route(s) determined by the route engine 114 may be stored for future use. For example, a route may be determined in advance of the planned movement such that the route may be used for planning purposes and/or may be viewed during the movement using the route. The stored route may be used by entities for which the route was determined or by other entities. The route may be stored so that another entity that plans on traveling to the same/overlapping location(s) may benefit from the previously determined route. For example, a previously determined route may provide for movement from a location A to a location B. A new route may be determined for movement from the location A to a location C with the previously determined path(s)/course(s) being used for movement from the location A to the location B along with new path(s)/course(s) being determined for movement from the location B to the location C. Other usage of stored routes are contemplated. Many variations are possible.

Information corresponding to route(s) determined by the route engine 114 may be pushed to and/or pulled by a user device. A user device may refer to a computing device through which a user may access the route(s). For example, a user device may include a desktop device (e.g., desktop computer/terminal) or a mobile device (e.g., smartphone, tablet, smartwatch, laptop). The information corresponding to the route(s) may be pushed to and/or pulled by the user device before and/or during the user's usage of the route(s). For example, a route may pulled to the user device based on a user's request for a route to move from location A to location B. During the user's use of the route, the route may be changed (e.g., based on changes in the environment, changes in environmental conditions, changes in movement plans) and the changed route may be pushed to the user device for navigating.

In various embodiments, the cost engine 116 is configured to determine a composite cost of using a route. A composite cost may refer to a combination of two or more costs for using the route. For example, a composite cost may include a temporal cost component and a non-temporal cost component. As another example, a composite cost may include temporal cost component and multiple non-temporal cost components. As another example, a composite cost may include multiple non-temporal cost components. The cost engine 116 may determine a composite cost based on a weighing of cost components. The different cost components may be weighed the same or differently for the composite cost determination. For example, the temporal cost component and the non-temporal cost component may be weighed the same for composite cost determination. As another example, the temporal cost component and the non-temporal cost component may be weighed differently and/or two different non-temporal cost components may be weighed the same or differently (e.g., based on user profile). A composite cost may include other cost components/other combinations of cost components.

A temporal cost component may reflect a time duration expected to be needed to use the route. A temporal cost component may be determined based on a temporal route graph (edge/node weighting). Different temporal route graphs may be used for different entities and/or different modes of travel (e.g., different temporal route graphs for person A versus person B, different temporal route graphs for bus versus train). A temporal cost component may reflect a combination of expected time durations needed to travel between locations (weights of edges between nodes) and expected time durations to be spent at one or more particular location (e.g., weights of nodes).

A non-temporal cost component may reflect a measure of a characteristic of an environment through which the route travels. A non-temporal cost component may be determined based on a two-dimensional non-temporal cost map (e.g., pixel cost). The two-dimensional non-temporal cost map may provide the non-temporal cost of moving over a location based on corresponding colors/intensities of pixels associated with the location in the two-dimensional non-temporal cost map. The characteristic of the environment may include at least one of a geographic characteristic, a preference characteristic, a difficulty characteristic, or a risk characteristic.

A geographic characteristic may refer to one or more characteristics that relates to the geography of an area. For example, geographic characteristics may include an elevation of an area, difficulty traveling in the area (e.g., whether the area is smoothed/paved or rough/rocky, etc.), water current/wind speed of an area, temperature/climate in the area, shade/sunlight in the area, breathability of air in the area, and/or other geographic characteristics. A preference characteristic may refer to one or more characteristics that relate to preferences (e.g., personal preferences) of entities that use the route. For example, preference characteristics may include a preferred mode of travel for an entity, preferred conditions of travel for an entity, a preferred environment of travel for an entity, and/or other preference characteristics. A difficulty characteristic may refer to one or more characteristics that relate to a difficulty of moving (or traveling) within an area. A difficulty characteristic may be general to an area or specific to an entity. For example, different two-dimensional non-temporal cost maps for difficulty of moving within an area may be provided for different entities/types of entities. A risk characteristic may refer to one or more characteristics that relate to risk of moving within an area. A risk characteristic may be general to an area or specific to an entity. For example, different two-dimensional non-temporal cost maps for corresponding risks of moving (or traveling) within an area may be provided for different entities/types of entities.

The characteristic of an environment may be static (e.g., does not change over time) or dynamic (e.g., changes over time). For example, difficulty characteristics for moving within an area may change based on the season, weather conditions, and/or other factors. The risk characteristics for moving within an area may change based on occurrences of one or more events, proximity of particular entities/groups within/near the area, and/or other information. For example, a particular characteristic (e.g., difficulty, risk) of an environment may exist based on an occurrence of an event (e.g., snowfall, landslide, accident). In such embodiments, the non-temporal cost from the event may be projected (in time and/or space) in the non-temporal cost map. For example, the difficulty and/or risk of moving within an area may change based on a recent landslide or an accident (e.g., vehicular accident, power outage, etc.). The non-temporal costs from such events may change (or deteriorate) over time (e.g., disappear in time). The non-temporal costs from such events may be localized (e.g., changes the costs at the event location) or may be spread out to other areas (e.g., changes the costs at nearby locations). The changes in costs from such events may be projected in time and/or space based on one or more propagation/diffusion functions (e.g., linearly, quadratically, over a given duration of time). The changes in costs from such events may be different based on the entities (e.g., risk to civilians increased more than risk to rescuers).

In various embodiments, the interface engine 118 is configured to provide one or more interfaces through which the composite cost is accessible. The interface(s) may include application program interface(s) (APIs) and/or user interface(s). For example, the interface engine 118 may provide one or more APIs that may be used by users/ computing systems to access a composite cost for using a particular route. As another example, the interface engine 118 may provide one or more user interfaces (e.g., web user interface accessible through a browser) through which users may view the composite cost for using the particular route. The composite cost may be accessed as a whole and/or in parts. For example, the cost composite cost may include a score (e.g., number and/or letter score) generated based on a combination of a temporal cost component (e.g., time) and a non-temporal cost component (e.g., number and/or letter score). The interface(s) may allow a user to view the score generated based on the combination of the temporal cost and the non-temporal cost and/or view the components costs separately (e.g., the temporal cost and/or the non-temporal cost). For example, a user interface may provide a view of an expected time duration to use the route, expected traffic time to use the route, the expected level of danger in using the route, and/or other information. In some embodiments, one or more portions of the user interface may be viewed using 3D/virtual reality technology. For example, the route may be overlaid over a three-dimensional representation of the environment through which the route travels and the positions of the entities using the route may be displayed in a 3D/virtual reality environment. As another example, the timeline of time required for entities to travel over different portions of the route may be displayed in a 3D/virtual reality environment.

In some embodiments, the composite cost accessible through the interface(s) may be dynamic. That is, the composite cost (and/or the component costs) viewed through the interface(s) may change based on changes in the route (e.g., changes in the paths/courses, changes in the properties/ conditions of the route/environment). For example, a user interface may enable a user to change one or more portions (e.g., paths/courses) of the route (e.g., using free draw) and the composite cost (and/or the component costs) shown on the user interface may change (e.g., elevation sent up while danger level went down). Such dynamic views of composite costs may enable users to make changes to the route while viewing the changes in the composite cost and/or the component costs of using the route.

In some embodiments, the interface(s) may provide for visualization of the temporal and geospatial aspects of the movement along the route. That is, the interface(s) may visually show the expected durations needed to use a route (and/or portions of the route) and where the route travels. For example, a user interface may display a map of the area/environment through which the route travels. The route may be graphically displayed (e.g., overlaid) on the map and the times required to travel over different portions of the route may be displayed on a timeline.

In some embodiments, the interface(s) may provide different visualizations of different cost components (e.g., the temporal cost component and/or the non-temporal cost component) of the composite cost. For example, a user interface may display the temporal cost component and the non-temporal cost component differently (e.g., using different colors, font, symbols, shapes, icons) such that components of the composite cost are readily discernable. For example, the values/letters corresponding to the different cost components may be displayed differently and/or portions of the route corresponding to different cost components (e.g., more risky portion of a path/course, an expected delay in travel time) may be displayed differently on the route. For example, a user interface may display different risk levels associated with different portions of the route using different colors while other characteristics associated with different portions of the route may be displayed through other means (e.g., icon, description, dotted vs solid lines, etc.).

The different visualizations of the different cost components of the composite cost may enable the user to better understand the context of the costs (e.g., context of risk/ dangers along the path) and/or to plan the movement. For example, based on the visualization of the different cost components, a user may change the route to a configuration with acceptable levels of cost (e.g., minimize risk in using the route, balance the risk of using the route to expected time duration for using the route). As another example, based on the visualization of the different cost components, a user may determine changes in which entities will take which paths/courses. As another example, based on the visualization of the different cost components, a user may be able to oversee the entities using the route to better oversee/coordinate the movement (e.g., alert an entity as to upcoming danger, advise an entity that it is falling behind in schedule/ another entity has already reached a particular location and is waiting, etc.).

Figure 2:
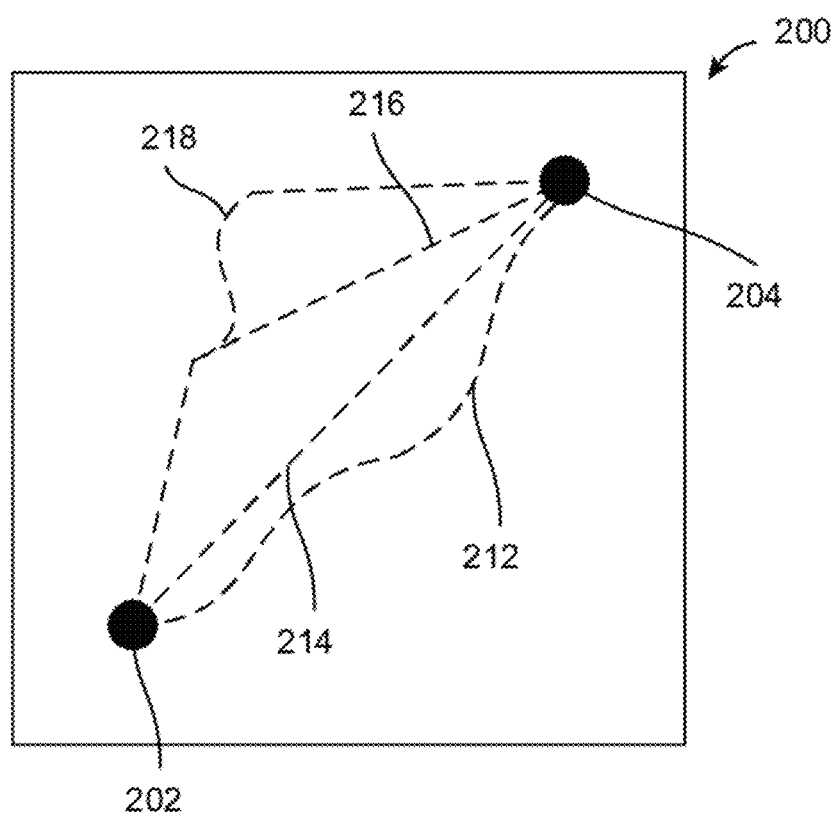
FIG. 2 illustrates example routes for a planned movement, in accordance with various embodiments.

FIG. 2 illustrates example routes 200 for a planned movement, in accordance with various embodiments. The routes 200 may have been determined by a computing system (such as the computing system 102). The routes 200 may include different routes determined for a starting location 202 and an ending location 204 or may include different paths/courses (e.g., optional paths/courses) for a route between the starting location 202 and the ending location 204.

For example, the routes 200 may include paths/routes 212, 214, 216, 218. The path/route 214 may travel in a straight line between the starting location 202 and the ending location 204. The path/route 212 may travel in a curved line below the path/route 214. The path/route 216 may travel in an angled line above the path/route 214. The path/route 218 may share the beginning portion of the path/route 216 and then branch out in a curve at the end to the ending location 204. One or more of the paths/routes 212, 214, 216, 218 may include one or more intermediate locations (waypoints). Many variations are possible.

Figures 3A, 3B:
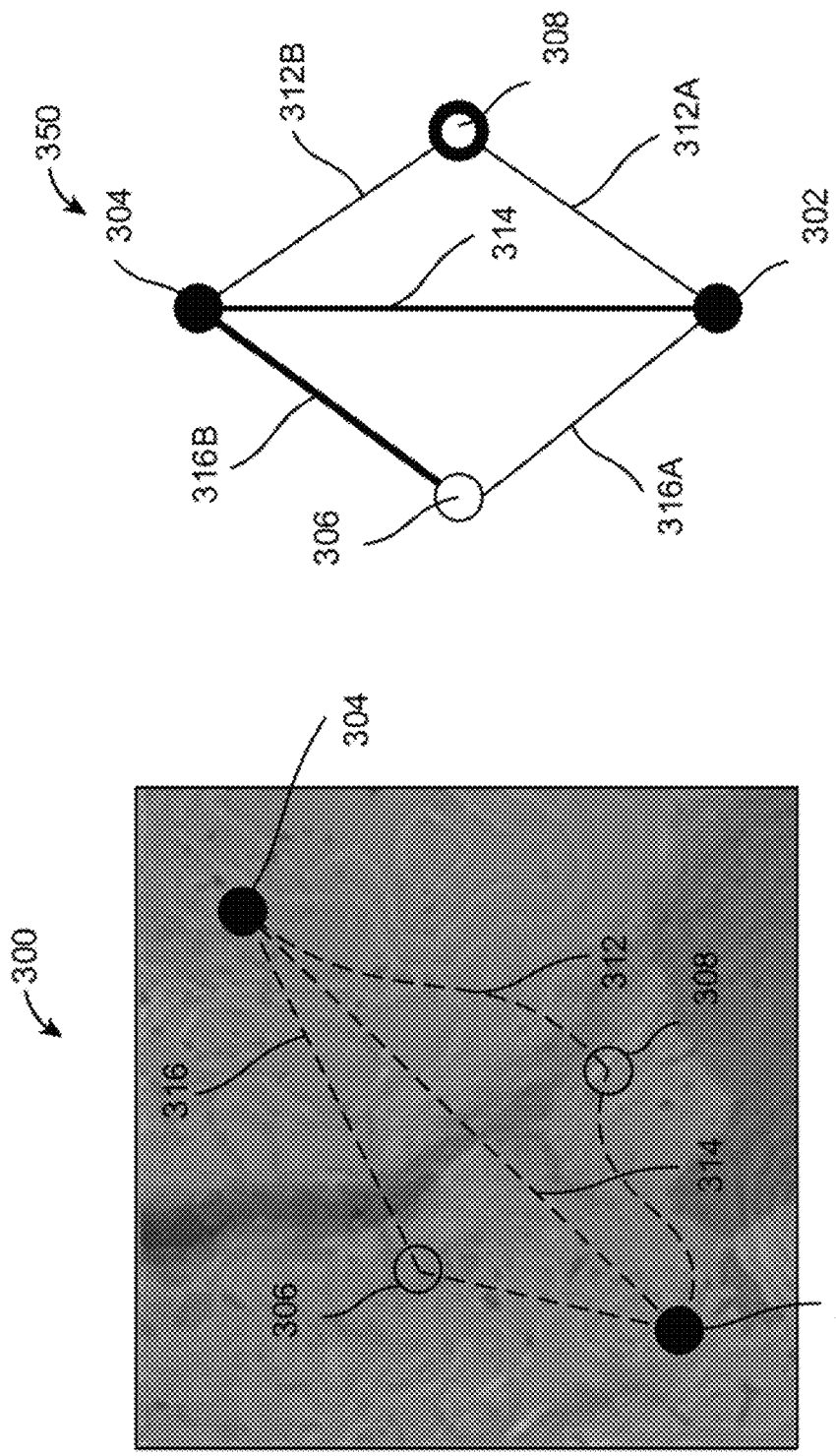
FIG. 3A illustrates an example two-dimensional non-temporal cost map, in accordance with various embodiments.
FIG. 3B illustrates an example temporal route graph, in accordance with various embodiments.

FIG. 3A illustrates an example two-dimensional non-temporal cost map 300, in accordance with various embodiments. The two-dimensional non-temporal cost map 300 may include a rasterized visualization of a non-temporal cost of moving across different points/areas (e.g., from a node 302 to a node 306, from the node 306 to a node 304, from the node 302 to the node 304, from the node 302 to a node 308, and from the node 308 to the node 304). The non-temporal cost reflected in the two-dimensional non-temporal cost map 300 may relate to one or more characteristics of an environment through which a route travels. For example, the non-temporal cost may reflect a measure of cost in terms of one or more geographic characteristics, preference characteristics, difficulty characteristics, risk characteristics, and/or other characteristics of the environment through which the route travels. The measure of the cost for moving over a location may be represented by corresponding colors/intensities of pixels in the two-dimensional non-temporal cost map 300 (e.g., pixel cost). The two-dimensional non-temporal cost map 300 may be used to determine a non-temporal cost of using a particular route (e.g., routes 312, 314, 316). Many variations are possible.

FIG. 3B illustrates an example temporal route graph 350, in accordance with various embodiments. The temporal route graph 350 may include a graph of nodes 302, 304, 306, 308 and edges 312A, 312B, 314, 316A, 316B that represent different times (or time-based costs) required to use a given path/course (e.g., the routes 312, 314, 316 shown in FIG. 3A). Individual nodes 302, 304, 306, 308 on the graph may represent a location. For example, the node 302 may represent a starting location and the node 304 may representing an ending location. The node 306 may represent an intermediate location on the route 316 and the node 308 may represent another intermediate location along the route 312. One or more nodes 302, 304, 306, 308 may be associated with a time requirement. For example, the node 308 may be associated with a thirty-minute time period. In this example, an entity using the route is expected to spend thirty minutes at the waypoint before moving on. Individual edges 312A, 312B, 314, 316A, 316B between the nodes 302, 304, 306, 308 may represent the time required to move between the locations. The temporal route graph 350 may be used to determine an expect time duration needed to use a particular route (e.g., routes 312, 314, 316). Many variations are possible.

Figure 4A:
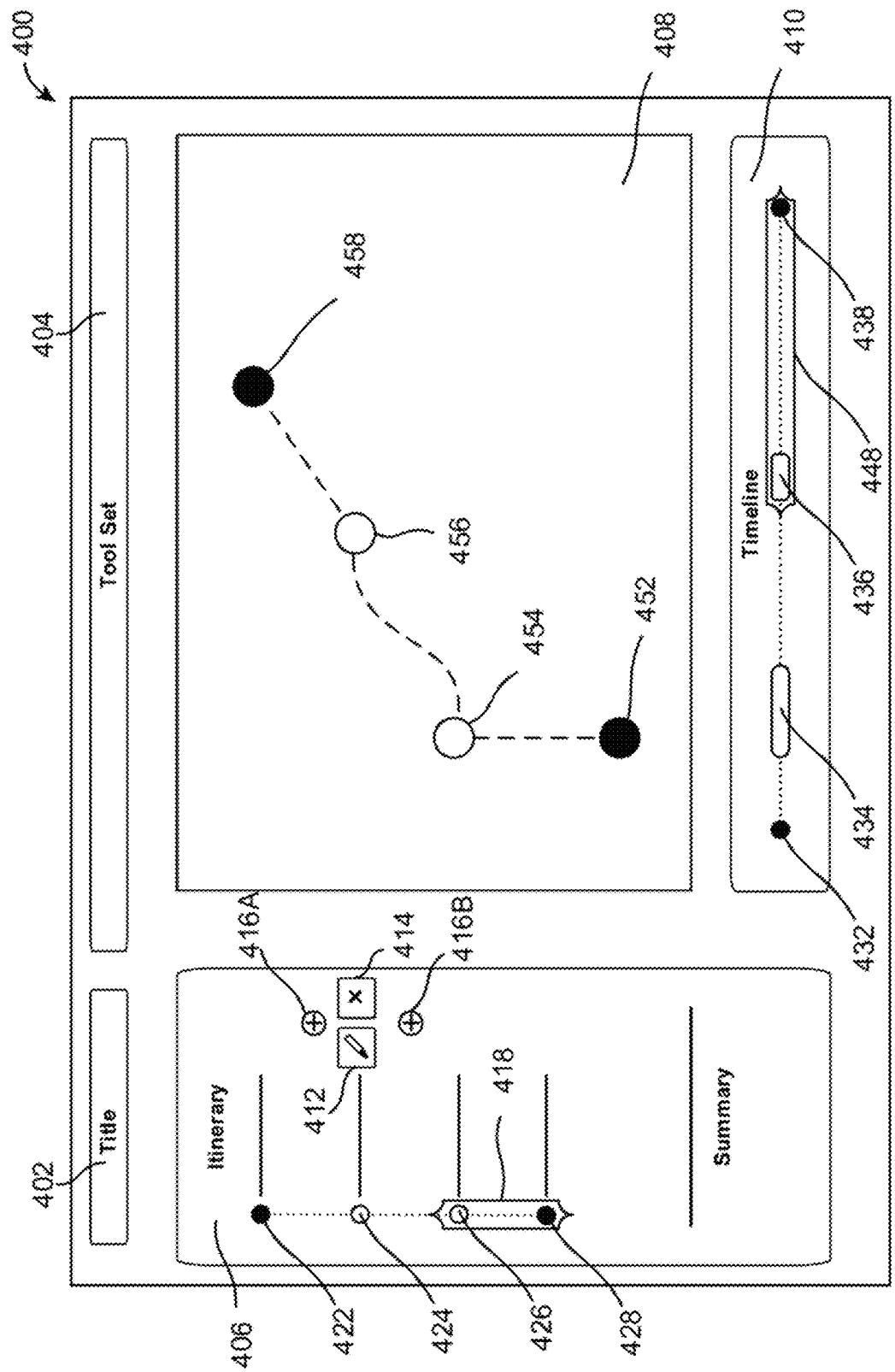
FIG. 4A illustrates an example interface for flexible route planning, in accordance with various embodiments.

FIG. 4A illustrates an example user interface 400 for flexible route planning, in accordance with various embodiments. In various embodiments, the user interface 400 may be accessed through a software application running on a computing device (e.g., computers, mobile phones, tablets, etc.) that includes one or more processors and memory. For example, the user interface 400 may be accessible through a web browser. In another example, the user interface 400 may be provided through a data analysis application. In yet another example, the user interface 400 may be provided as a service over a network (e.g., software as a service). Depending on the computing device, a user may be able to interact with the user interface 400 using various input devices (e.g., keyboard, mouse, etc.) and/or touch gestures. The user interface 400 is provided merely as an example and, naturally, the arrangement and configuration of such user interfaces can vary depending on the implementation. Thus, depending on the implementation, the user interface 400 may include additional features and/or alternative features.

The user interface 400 may include a title field 402, a tool set field 404, an itinerary region 406, a display region 408, a timeline region 410, and/or other fields, regions, options. The title field 402 may display a title of the information (e.g., map, objective, area, route) being displayed in the user interface 400. The tool set field 404 may include one or more tools to use and/or change the information displayed in the interface user 400. For example, the tool set field 404 may include a search field that enables a user to search for particular map/object/area/route, data addition/removal field that enables a user to add/remove data (e.g., layer) from the map, export field that enables a user to export a given map/given display of a map, and/or other fields.

The user interface 400 may provide for visualization of temporal and geospatial aspects of the movement along the route. The user interface 400 may provide for different visualization of a temporal cost component and/or a non-temporal cost component of a composite cost for the route.

The itinerary region 406 may display locations within a route, such as a starting location, an ending location, one or more intermediate locations (waypoints), and/or other locations. For example, a starting location may be indicated by an icon/image/line 422, two intermediate locations may be indicated by icons/images/lines 424, 426, and an ending location for a route may be indicated by an icon/image/line 428. The itinerary region 406 may display summary information about the route. The summary information for the route may include information relating to the route, such as a composite cost of using the route and the component costs (e.g., temporal cost component, non-temporal cost component) of using the route, such as expected duration of the route, distance to be traveled, a measure of one or more geographic characteristics, a measure of one or more preference characteristics, a measure of one or more difficulty characteristics, and/or a measure of one or more risk characteristics.

The itinerary region 406 may visually present various information about the route. The itinerary region 406 may use colors, fonts, symbols, shapes, icons, and/or other visual representation to provide information about the route. For example, the use of a particular mode of transportation may be shown with a visual 418. The visual 418 may indicate that the route includes a particular mode of transportation between the second intermediate location (indicated by the icon/image/line 426) and the ending location (indicated by the icon/image/line 428). The itinerary region 406 may include one or more options to set the mode of travel for one or more portions of the route. Other visualizations of information describing routes (e.g., temporal cost, non-temporal cost, mode of travel) are contemplated.

The itinerary region 406 may include options 412, 414, 416A, 416B which a user may select to change the locations along a route. The option 412 may enable a user to enter a location for a route (e.g., enter a new location, change an existing location). The option 414 may enable a user to remove a location from the route. The option 416A may enable a user to enter a new intermediate/starting location for the route. The option 416B may enable a user to enter a new intermediate/ending location for the route. Other options for changing a route using the itinerary region 406 are contemplated.

The display region 408 may display one or more portions of a route. The route may be overlaid over a map and/or other information. The display region 408 may display various information about the route (e.g., icons/shapes/symbols representing numbers/locations of particular objects in the environment, roads, buildings, barriers, environment information, etc.). The display region 408 may display locations within the route, such as a node 452 representing the starting location, nodes 454, 456 representing intermediate locations, and a node 458 representing the ending location. One or more portions of the route may be presented differently to provide different information about the route. For example, portions of routes between the nodes 452, 454, 456, 458 may be displayed using different colors/line types to indicate the mode of transportation for the portion, the temporal cost component for the portion, the non-temporal cost component for the portion, and/or other information about the route. The display region 408 may enable a user to view composite/component costs for a route/portion of a route based on user interaction within the display region 408 (e.g., mouse hovering over a route/portion of a route).

The display region 408 may enable a user to change/determine a route. For example, the display region 408 may enable a user to enter a new location for the route by inserting a location (e.g., starting, intermediate, ending) in the map. The display region 408 may enable a user to determine particular paths/courses to be include within the route (e.g., free draw). The display region 408 may include one or more options to set the mode of travel for one or more portions of the route. Other changes/determinations of a route using the display region 408 are contemplated.

The timeline region 410 may provide one or more timelines for a route. A timeline for a route may visually display temporal aspect of the route in relation to locations within the route. For example, the timeline region 410 may include icons/symbols 432, 434, 436, 438 representing the starting location, the two intermediate locations, and the ending location. The distances between locations in the timeline may each indicate a corresponding amount of time needed to travel between the locations. The length/size of the icons/symbols 434, 436 may indicate an amount of time an entity is expected to stay at the two intermediate locations, respectively. The visual 448 may indicate that the route includes a particular mode of transportation between the second intermediate location (indicated by the icon/symbol 436) and the ending location (indicated by the icon/symbol 438). One or more portions of the route in the timeline region 410 may be presented differently to provide different information about the route. For example, portions of routes between icons/symbols 432, 434, 436, 438 may be displayed using different colors/line types to indicate the mode of transportation for the portion, the temporal cost component for the portion, the non-temporal cost component for the portion, and/or other information about the route. Other visual representation of information relating to the route are contemplated.

Figure 4B:
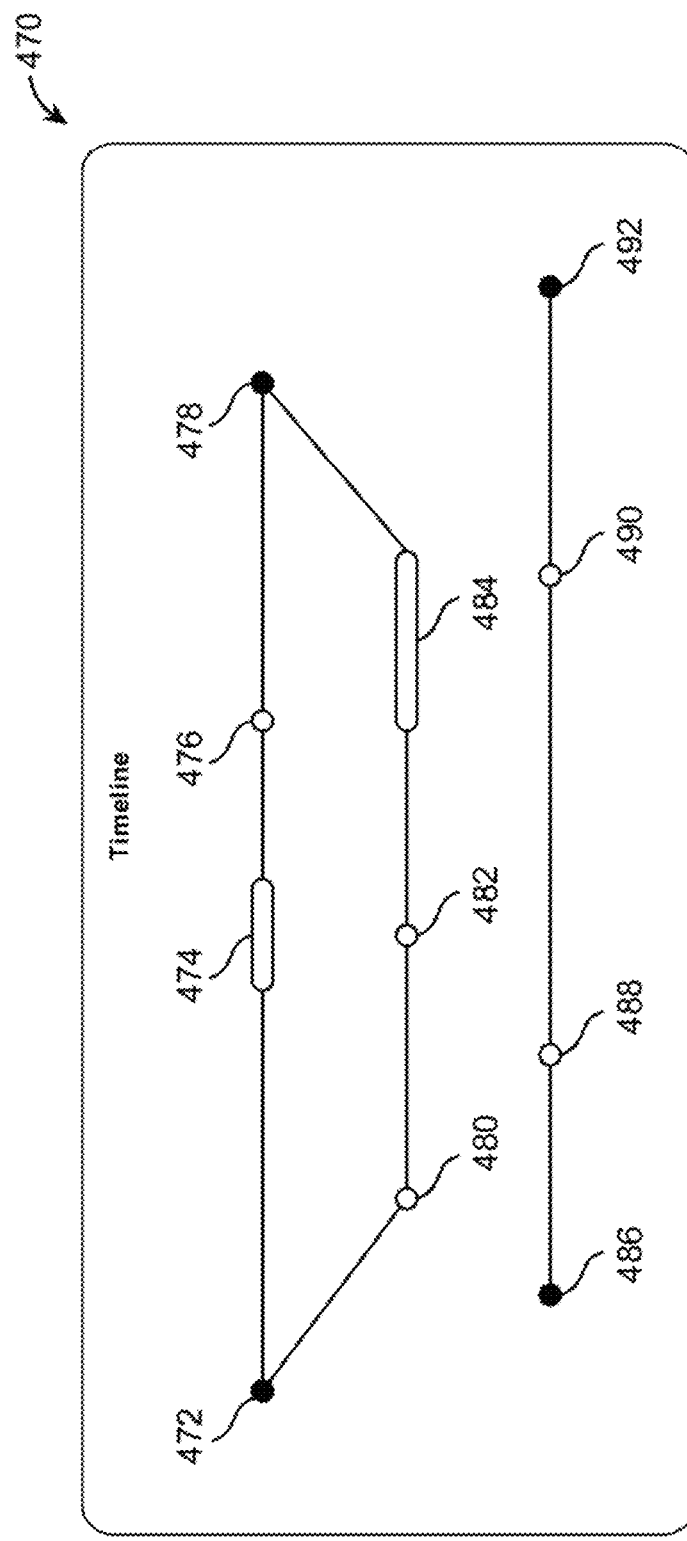
FIG. 4B illustrates an example timeline interface, in accordance with various embodiments.

FIG. 4B illustrates an example timeline interface 470, in accordance with various embodiments. The timeline interface 470 may be presented within one or more user interfaces for flexible route planning, such as within the user interface 400 (e.g., within the timeline region 410) shown in FIG. 4A. In various embodiments, the timeline interface 470 may be accessed through a software application running on a computing device (e.g., computers, mobile phones, tablets, etc.) that includes one or more processors and memory. For example, the timeline interface 470 may be accessible through a web browser. In another example, the timeline interface 470 may be provided through a data analysis application. In yet another example, the timeline interface 470 may be provided as a service over a network (e.g., software as a service). Depending on the computing device, the user may be able to interact with the timeline interface 470 using various input devices (e.g., keyboard, mouse, etc.) and/or touch gestures. The timeline interface 470 is provided merely as an example and, naturally, the arrangement and configuration of such user interfaces can vary depending on the implementation. Thus, depending on the implementation, the timeline interface 470 may include additional features and/or alternative features.

The timeline interface 470 may provide for a route for movement of multiple entities. For example, the timeline interface 470 may provide for a starting location 472 for a first entity and a second entity, and a starting location 486 for a third entity. The first entity may move from the starting location 472 to a location 474, hold at the location 474 for a pre-determined duration, move to a location 476, and complete the planned movement by moving to an ending location 478. The second entity may move to a location 480, move to a location 482, move to a location 484, hold at the location 484 for a pre-determined duration, and complete the planned movement by moving to the ending location 478. The third entity may move from the starting location 486 to a location 488, move to a location 490, and complete the planned movement by moving to an ending location 492.

The timeline interface 470 may provide for coordination of the planned movement of the multiple entities. For example, the timeline interface 470 may provide for a movement in which the first and second entities begin the movement before the third entity. The planned movement may include the first entity staying at the location 474 before, during, and after the second entity arrives at the location 482 (e.g., the first entity moves into the location 474, holds the position while waiting for the second entity to move into the location 482, and then leave the location 474 after the second entity leaves the location 482). The planned movement may include the first entity arriving at the location 476 and the second entity arriving at the location 484 at approximately the same time, and the second entity staying at the location 484 until the third entity has reached and departed from the location 490. The planned movement may include the first and second entities arriving at the ending location 478 at approximately the same time, and the third entity arriving at the ending location 492 afterwards. Other planned movement of single/multiple entities are contemplated.

The timeline interface 470 may provide for visualization of the usage of the route. For example, locations of one or more entities (e.g., first, second, and third entities) using the route may be overlaid/presented within the timeline interface 470 such that a user (e.g., coordinator) may see whether one or more of the entities are moving on scheduling, moving faster than planned, and/or moving slower than planned. Such visualization of locations of entities using the route along with the visualization of the planned route may enable coordination of the entities on the route. For example, such visualization may assist a coordinator to help the entities get back on schedule (e.g., instruct an entity to slow down to match progress of other entities, instruct an entity to speed up to catch up to other entities).

Figure 5:
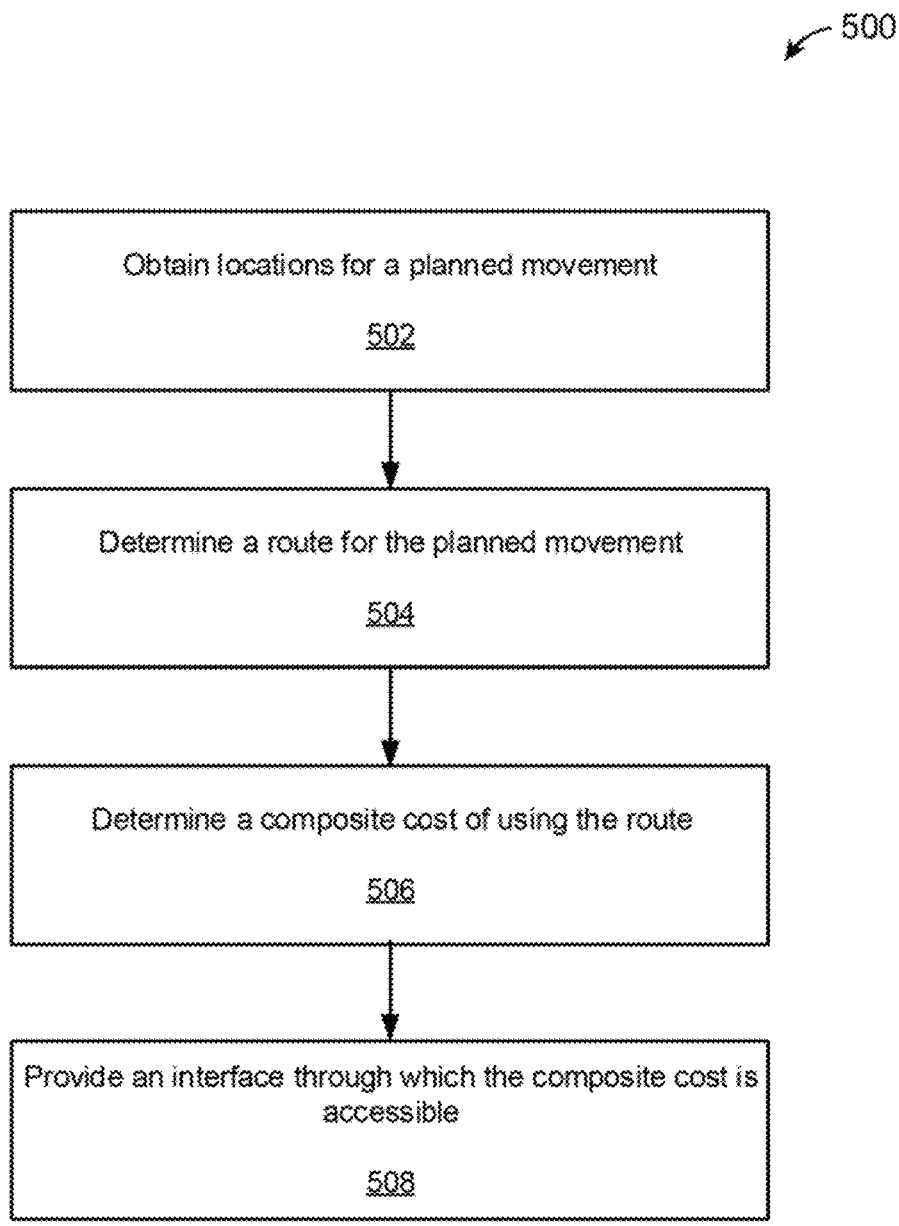
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, locations for a planned movement may be obtained. The location may include at least a starting location and an ending location. At block 504, a route for the planned movement may be determined. The route may include at least the starting location and the ending location. At block 506, a composite cost of using the route may be determined. The composite cost may include at least a temporal cost component and a non-temporal cost component. At block 508, an interface may be provided. The composite cost may be accessible through the interface.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
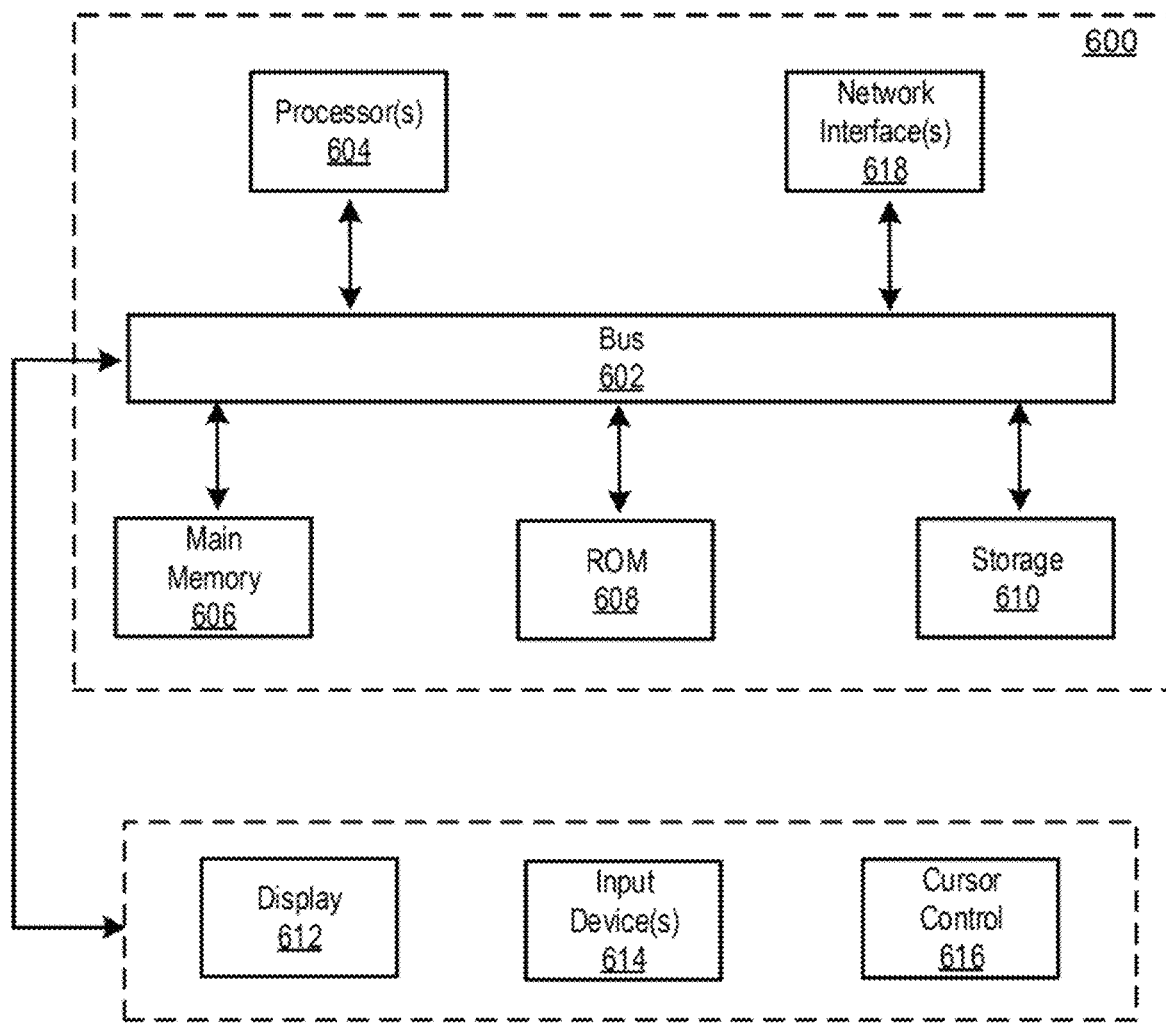
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining locations for a planned movement of multiple entities, wherein the locations include at least a first starting location associated with a first entity of the multiple entities, a second starting location associated with a second entity of the multiple entities, and an ending location associated with at least one of the first entity or the second entity; and
determining a route for the planned movement of the multiple entities based on the locations, wherein the route includes a path through the first starting location, the second starting location, and the ending location, the determination of the route comprising:
determining a plurality of routes for the planned movement of the multiple entities;
randomizing a subset of the plurality of routes;
selecting the route for the planned movement of the multiple entities from the plurality of routes following randomization of the subset.

2. The system of claim 1, wherein the locations further include one or more intermediate locations associated with at least one of the first entity or the second entity.

3. The system of claim 1, wherein the instructions further cause the system to perform:
determining a composite cost of using the route, the composite cost comprising a temporal cost and a non-temporal cost, wherein the temporal cost component is determined based on a temporal route graph and the non-temporal cost component is determined based on a two-dimensional non-temporal cost map.

4. The system of claim 3, wherein the temporal cost component reflects an expected time duration to use the route for the planned movement of the multiple entities.

5. The system of claim 1, wherein the characteristic further includes a geographic characteristic, a preference characteristic, and a difficulty characteristic associated with using the route.

6. The system of claim 1, wherein the route provides multiple modes of motion associated with the route.

7. The system of claim 1, wherein the instructions further cause the system to perform:
providing an interface that enables creation of a new path for the route based on a change to the environment through which the route travels, wherein the change to the environment includes a change in events associated with the route or a change in weather conditions associated with the route.

8. A method implemented by a computing system including one or more processors and a storage media storing machine-readable instructions, wherein the method is performed using the one or more processors, the method comprising:
- obtaining locations for a planned movement of multiple entities, wherein the locations include at least a first starting location associated with a first entity of the multiple entities, a second starting location associated with a second entity of the multiple entities, and an ending location associated with at least one of the first entity or the second entity; and
- determining a route for the planned movement of the multiple entities based on the locations, wherein the route includes a path through the first starting location, the second starting location, and the ending location, the determination of the route comprising:
  - determining a plurality of routes for the planned movement of the multiple entities;
  - randomizing a subset of the plurality of routes;
  - selecting the route for the planned movement of the multiple entities from the plurality of routes following randomization of the subset.

9. The method of claim 8, wherein the locations further include one or more intermediate locations associated with at least one of the first entity or the second entity.

10. The method of claim 8, further comprising:
- determining a composite cost of using the route, the composite cost comprising a temporal cost and a non-temporal cost, wherein the temporal cost component is determined based on a temporal route graph and the non-temporal cost component is determined based on a two-dimensional non-temporal cost map.

11. The method of claim 10, wherein the temporal cost component reflects an expected time duration to use the route for the planned movement of the multiple entities.

12. The method of claim 8, wherein the characteristic further includes a geographic characteristic, a preference characteristic, and a difficulty characteristic associated with using the route.

13. The method of claim 8, wherein the route provides multiple modes of motion associated with the route.

14. The method of claim 8, further comprising providing an interface that enables creation of a new path for the route based on a change to the environment through which the route travels, wherein the change to the environment includes a change in events associated with the route or a change in weather conditions associated with the route.

15. A non-transitory computer readable medium of a computing system comprising instructions that, when executed, cause one or more processors of the computing system to perform:
- obtaining locations for a planned movement of multiple entities, wherein the locations includes at least a first starting location associated with a first entity of the multiple entities, a second starting location associated with a second entity of the multiple entities, and an ending location associated with at least one of the first entity or the second entity; and
- determining a route for the planned movement of the multiple entities based on the locations, wherein the route includes a path through the first starting location, the second starting location, and the ending location, the determination of the route comprising:
  - determining a plurality of routes for the planned movement of the multiple entities;
  - randomizing a subset of the plurality of routes;
  - selecting the route for the planned movement of the multiple entities from the plurality of routes following randomization of the subset.

16. The non-transitory computer readable medium of claim 15, wherein the locations further include one or more intermediate locations associated with at least one of the first entity or the second entity.

17. The non-transitory computer readable medium of claim 15, wherein the instructions further cause the computing system to perform:
- determining a composite cost of using the route, the composite cost comprising a temporal cost and a non-temporal cost, wherein the temporal cost component is determined based on a temporal route graph and the non-temporal cost component is determined based on a two-dimensional non-temporal cost map.

18. The non-transitory computer readable medium of claim 17, wherein the temporal cost component reflects an expected time duration to use the route for the planned movement of the multiple entities.

19. The system of claim 7, wherein the instructions, when executed, further cause the system to perform:
- adjusting, through the interface, a level of detail associated with the route as the first entity and the second entity travel along the route.

* * * * *